US011635333B2

(12) United States Patent
Dunn et al.

(10) Patent No.: US 11,635,333 B2
(45) Date of Patent: Apr. 25, 2023

(54) LOW-PROFILE SENSOR CIRCUIT MOUNTING FIXTURE

(71) Applicant: RAYTHEON TECHNOLOGIES CORPORATION, Farmington, CT (US)

(72) Inventors: Colby S. Dunn, East Hartford, CT (US); Christopher Waitkus, New York, NY (US)

(73) Assignee: Raytheon Technologies Corporation, Farmington, CT (US)

( * ) Notice: Subject to any disclaimer, the term of this patent is extended or adjusted under 35 U.S.C. 154(b) by 21 days.

(21) Appl. No.: 17/212,838

(22) Filed: Mar. 25, 2021

(65) Prior Publication Data

US 2022/0307909 A1    Sep. 29, 2022

(51) Int. Cl.
  *G01K 1/14*   (2021.01)
  *B64D 33/00*  (2006.01)
  *F16B 2/12*   (2006.01)
  *B64D 45/00*  (2006.01)

(52) U.S. Cl.
  CPC .............. *G01K 1/14* (2013.01); *B64D 33/00* (2013.01); *F16B 2/12* (2013.01); *B64D 2045/009* (2013.01)

(58) Field of Classification Search
  CPC ..... G01K 1/14; F16B 2/12; F16B 2/10; F16L 3/1233; F16L 3/237; F16L 3/127
  See application file for complete search history.

(56) References Cited

U.S. PATENT DOCUMENTS

| 2,440,469 | A | * | 4/1948 | Goddard | F16L 3/1233 |
| | | | | | 248/68.1 |
| 3,054,586 | A | * | 9/1962 | Kirkup | F16L 3/1075 |
| | | | | | 248/74.1 |
| 3,054,587 | A | | 9/1962 | Hebenstreit et al. | |
| 3,376,004 | A | * | 4/1968 | Goldman | F16L 3/123 |
| | | | | | 248/62 |
| 3,815,855 | A | * | 6/1974 | Appleton | F16L 3/1233 |
| | | | | | 174/40 CC |
| 4,234,999 | A | * | 11/1980 | Winter | F16L 3/1008 |
| | | | | | 248/74.3 |
| 6,038,852 | A | * | 3/2000 | Celi | F16L 3/2235 |
| | | | | | 60/761 |
| 7,191,990 | B2 | * | 3/2007 | Hutter, III | F16B 37/044 |
| | | | | | 248/316.4 |
| 7,478,783 | B2 | | 1/2009 | Royer | |
| 9,482,113 | B2 | * | 11/2016 | Graily | B64C 1/406 |
| 10,550,870 | B2 | | 2/2020 | Lewis et al. | |
| 10,663,353 | B2 | | 5/2020 | Newlin et al. | |

(Continued)

OTHER PUBLICATIONS

European Patent Office, European Search Report dated Jul. 22, 2022 in Application No. 22163919.8.

*Primary Examiner* — Eret C McNichols
(74) *Attorney, Agent, or Firm* — Snell & Wilmer L.L.P.

(57) ABSTRACT

A mounting fixture for mounting a sensor circuit to a support rail is disclosed. In various embodiments, the mounting fixture includes a bracket having a base portion and a first flange member extending from the base portion; a clamp fixture connected to the first flange member, the clamp fixture including a plate member; a first pin extending through the first flange member and the plate member; and a first fastener threaded on to the first pin and configured to secure the plate member to the first flange member.

15 Claims, 6 Drawing Sheets

(56) References Cited

U.S. PATENT DOCUMENTS

| | | | |
|---|---|---|---|
| 10,703,311 B2* | 7/2020 | Davenport | F16L 3/237 |
| 10,931,090 B2* | 2/2021 | Rogers | F16B 7/0433 |
| 11,092,079 B2* | 8/2021 | Patil | B64D 45/00 |
| 2013/0294900 A1 | 11/2013 | Graily et al. | |
| 2015/0369396 A1* | 12/2015 | Handa | F16B 5/08 |
| | | | 248/65 |
| 2020/0064202 A1* | 2/2020 | Newlin | F16B 2/12 |
| 2020/0149662 A1 | 5/2020 | Lewis et al. | |
| 2021/0017909 A1 | 1/2021 | Patil et al. | |
| 2021/0172804 A1* | 6/2021 | Patil | F16L 3/237 |
| 2021/0285378 A1* | 9/2021 | Lakshmi | F01D 21/12 |
| 2021/0381901 A1* | 12/2021 | Newlin | F16L 3/1075 |

* cited by examiner

LOW-PROFILE SENSOR CIRCUIT MOUNTING FIXTURE

FIELD

The present disclosure relates generally to fire and overheat detection systems for use with aircraft and, more particularly, to mounting fixtures for fire and overheat detection systems.

BACKGROUND

Fire and overheat detection systems in aircraft engines typically utilize sensor circuits routed into or through engine areas or compartments that require monitoring for fire or overheat events. A voltage may be applied to the sensor circuits and the sensor circuits exhibit a fixed resistance when the engine is operating within proper temperature levels. Should a fire or overheat event occur in the engine, the resistance of the sensor circuit in that location of the engine will change (e.g., decrease in value) in response to the increase in temperature. The change in resistance in the sensor circuit then facilitates detection of the fire or overheat event and the location thereof. A mounting fixture (or a plurality of such fixtures) is used to hold the sensor circuit properly in place (or a plurality of such sensing circuits in place). The mounting fixtures should be sufficiently robust to withstand the high operating temperatures and high vibration levels present in aircraft engines. Other considerations include minimization of the size and weight of the mounting fixtures and enabling adequate access to the mounting fixtures during maintenance or routine inspection.

SUMMARY

A mounting fixture for mounting a sensor circuit to a support rail is disclosed. In various embodiments, the mounting fixture includes a bracket having a base portion and a first flange member extending from the base portion; a clamp fixture connected to the first flange member, the clamp fixture including a plate member; a first pin extending through the first flange member and the plate member; and a first fastener threaded on to the first pin and configured to secure the plate member to the first flange member.

In various embodiments, the base portion includes an undersurface configured to match a mounting surface of the support rail. In various embodiments, the first flange member includes a first slot configured to receive the first pin. In various embodiments, the first pin includes a first orifice extending in a direction along a longitudinal axis into the first pin and configured to receive a key. In various embodiments, the first orifice is polygonal-shaped. In various embodiments, the first pin includes a first head configured to abut a first underside surface of the first flange member.

In various embodiments, the bracket includes a second flange member extending from the base portion, the first flange member and the second flange member disposed on opposite sides of the base portion. In various embodiments, a second pin extends through the second flange member and the plate member. In various embodiments, a second fastener is threaded on to the second pin and configured to secure the plate member to the second flange member. In various embodiments, the second flange member includes a second slot configured to receive the second pin. In various embodiments, the second pin includes a second orifice extending into the second pin and configured to receive the key.

A method for mounting a sensor circuit to a support rail is disclosed. In various embodiments, the method includes attaching a bracket having a base portion and a first flange member extending from the base portion to the support rail; connecting a clamp fixture to the first flange member, the clamp fixture including a plate member; extending a first pin through the first flange member and the plate member; and threading a first fastener on to the first pin to secure the plate member to the first flange member.

In various embodiments, the base portion includes an undersurface configured to match a mounting surface of the support rail. In various embodiments, attaching the bracket to the support rail includes brazing or welding an undersurface of the base portion to a mounting surface of the support rail.

In various embodiments, threading the first fastener to the first pin includes preventing the first pin from rotating via a key configured for positioning into a first orifice extending in a direction along a longitudinal axis into the first pin. In various embodiments, the first pin includes a first head configured to abut a first underside surface of the first flange member.

In various embodiments, the bracket includes a second flange member extending from the base portion, the first flange member and the second flange member disposed on opposite sides of the base portion. In various embodiments, a second pin extends through the second flange member and the plate member and a second fastener in threaded on to the second pin to secure the plate member to the second flange member. In various embodiments, the second flange member includes a second slot configured to receive the second pin. In various embodiments, the second pin includes a second orifice extending into the second pin and configured to receive the key.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
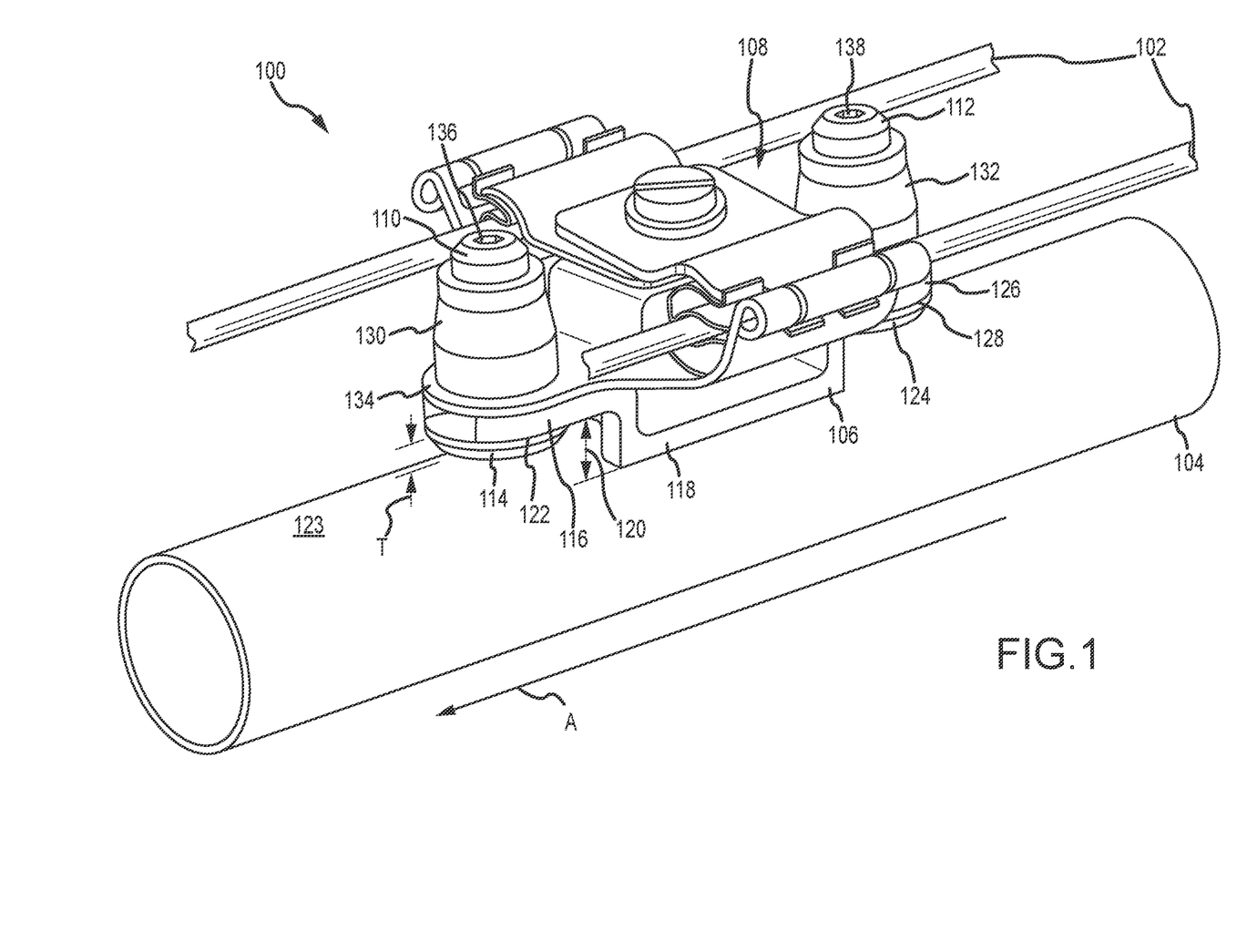
FIG. 1 is a schematic representation of a mounting fixture connecting a sensor circuit to a support rail, in accordance with various embodiments.

Referring now to the drawings, FIG. 1 schematically illustrates a mounting fixture 100 connecting a sensor circuit 102 to a support rail 104, with reference to an axial direction A. In various embodiments, the mounting fixture 100 includes a support spacer bracket 106 (or a bracket) mounted to the support rail 104. As discussed in further detail below, the support spacer bracket 106 is attached to mounting surface of the support rail 104 via a brazing process or a welding process or both. The support spacer bracket 106 is configured to secure a clamp fixture 108 to the support rail 104, the clamp fixture 108 being configured to secure the sensor circuit 102 in a fixed position with respect to the support rail 104. In various embodiments, a first pin 110 and a second pin 112 are configured to secure the clamp fixture 108 to the support spacer bracket 106. The first pin 110 includes a first head 114 configured to engage a first flange member 116 that extends axially from a base portion 118 (or a base member) of the support spacer bracket 106. In various embodiments, a first underside surface 122 of the first flange member 116 is spaced a distance 120 from an outer surface 123 of the support rail 104, where the distance 120 is just sufficient for the first head 114 to fit between the outer surface 123 and the first underside surface 122 of the first flange member 116; for example, if the first head defines an axial thickness equal to T, then the distance 120 should be about or approximately T in length. Similarly, the second pin 112 includes a second head 124 configured to engage a second flange member 126 that extends axially from the base portion 118 of the support spacer bracket 106, with the second flange member 126 being disposed generally opposite the first flange member 116 in the axial direction with the base portion 118 disposed therebetween the first flange member 116 and the second flange member 126. In various embodiments, a second underside surface 128 of the second flange member 126 is spaced the distance 120 from the outer surface 123 of the support rail 104, where the distance is just sufficient for the second head 124 to fit between the outer surface 123 and the second underside surface 128 of the second flange member 126.

Still referring to FIG. 1, a first collar 130 (or a first fastener) is configured for threaded engagement with the first pin 110 and a second collar 132 (or a second fastener) is configured for threaded engagement with the second pin 112. When the first collar 130 and the second collar 132 are securely fastened to the first pin 110 and the second pin 112, the collars 130, 132 secure a plate member 134 of the clamp fixture 108 to the first flange member 116 and to the second flange member 126, thereby locking the clamp fixture 108 in place with respect to the support spacer bracket 106 and, ultimately, with respect to the support rail 104. In various embodiments, the first pin 110 includes a first orifice 136 extending into the first pin 110 in a direction along a longitudinal axis running through the first pin 110 and, similarly, the second pin 112 includes a second orifice 138 extending into the second pin 112 in a direction along a longitudinal axis running through the second pin 112. Both the first orifice 136 and the second orifice 138 are polygonal-shaped (e.g., square or four-sided or hexagonal or six-sided) and configured to receive a correspondingly shaped tool or key (e.g., a square-key or a hex-key) such that the pins 110, 112 may be prevented from rotation with respect to the first flange member 116 and the second flange member 126 when the first collar 130 and the second collar 132 are secured, respectively, to the first pin 110 and to the second pin 112. The features just described enable securement of the plate member 134 to the first flange member 116 and to the second flange member 126 without the need to manipulate a tool (e.g., a wrench) between the outer surface 123 of the support member and the first underside surface 122 of the first flange member 116 and second underside surface 128 of the second flange member 126. The feature facilitates minimization of the distance 120 and also facilitates manipulation of the first pin 110 and the second pin 112 (e.g., to remove the clamp fixture 108 from the support spacer bracket 106) from an upper side of the clamp fixture 108, thereby reducing the space required for manipulation of tools. In addition, and as illustrated, the clamp fixture 106 may be configured to engage the sensor circuit 102 via a clamping force exerted on the sensor circuit 102 at one or more locations that are, in various embodiments, spaced laterally from the first flange member 116 and the second flange member 126 and that are, in various embodiments, positioned axially intermediate the first flange member 116 and the second flange member 126.

Figure 2A:
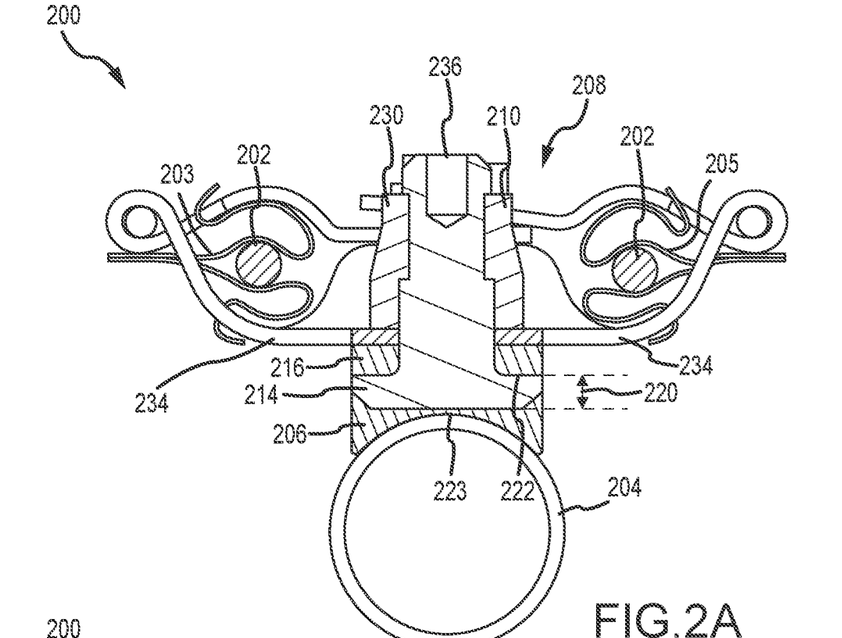
FIGS. 2A and 2B are schematic cross-sectional representations of a mounting fixture connected to a support rail, in accordance with various embodiments.
Figure 2B:
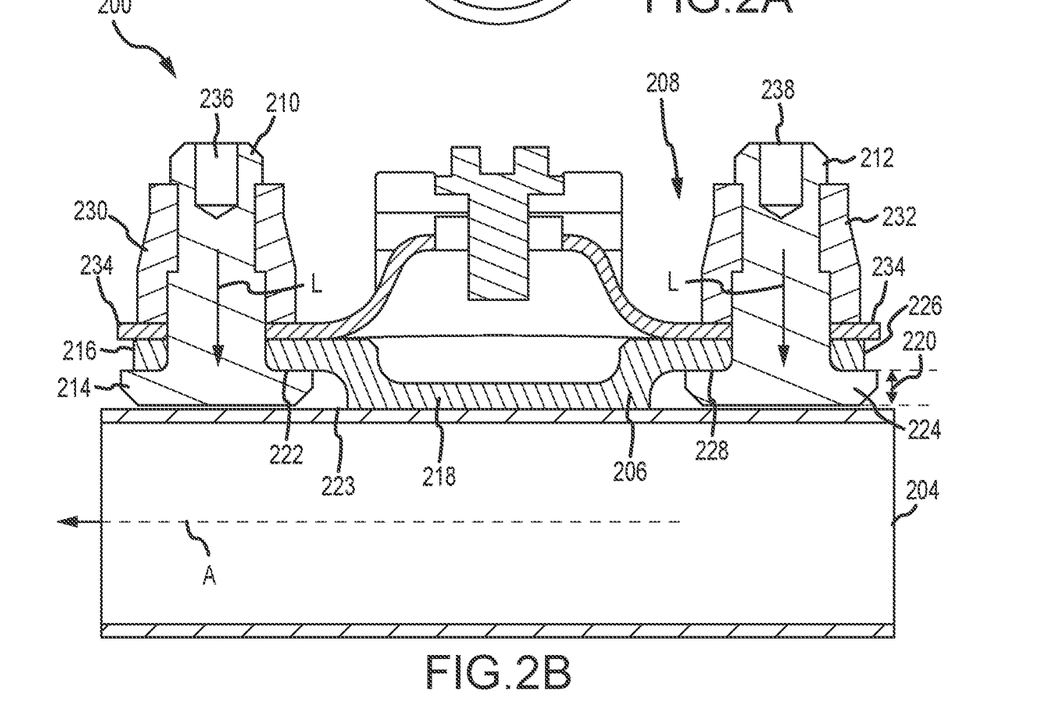

Referring now to FIGS. 2A and 2B, schematic cross-sectional representations of a mounting fixture 200 connected to a support rail 204 are provided in reference to an axial direction A. The mounting fixture 200 is similar to the mounting fixture described above with reference to FIG. 1, so like-numbered numerals are used to describe the schematic axial and cross-sectional representations. In various embodiments, the mounting fixture 200 includes a support spacer bracket 206 (or a bracket) mounted to the support rail 204. The support spacer bracket 206 is configured to secure a clamp fixture 208 to the support rail 204, the clamp fixture 208 being configured to secure a sensor circuit 202 in a fixed position with respect to the support rail 204 via a first spring assembly 203 and a second spring assembly 205 that are incorporated into the clamp fixture 208. In various embodiments, a first pin 210 and a second pin 212 are configured to secure the clamp fixture 208 to the support spacer bracket 206. The first pin 210 includes a first head 214 configured to engage a first flange member 216 that extends axially from a base portion 218 (or a base member) of the support spacer bracket 206. In various embodiments, a first underside surface 222 of the first flange member 216 is spaced a distance 220 from an outer surface 223 of the support rail 204, where the distance is just sufficient for the first head 214 to fit between the outer surface 223 and the first underside surface 222 of the first flange member 216. Similarly, the second pin 212 includes a second head 224 configured to engage a second flange member 226 that extends axially from the base portion 218 of the support spacer bracket 206, with the second flange member 226 being disposed generally opposite the first flange member 216 in the axial direction with the base portion 218 disposed between the first flange member 216 and the second flange member 226. In various embodiments, a second underside surface 228 of the second flange member 226 is spaced the distance 220 from the outer surface 223 of the support rail 204, where the distance 220 is just sufficient for the second head 224 to fit between the outer surface 223 and the second underside surface 228 of the second flange member 226.

Still referring to FIGS. 2A and 2B, a first collar 230 (or a first fastener) is configured for threaded engagement with the first pin 210 and a second collar 232 (or a second fastener) is configured for threaded engagement with the second pin 212. When the first collar 230 and the second collar 232 are securely fastened to the first pin 210 and to the second pin 212, the collars 230, 232 secure a plate member 234 of the clamp fixture 208 to the first flange member 216 and to the second flange member 226, thereby locking the clamp fixture 208 in place with respect to the support spacer bracket 206 and, ultimately, with respect to the support rail 204. In various embodiments, the first pin 210 includes a first orifice 236 extending into the first pin 210 in a direction along a longitudinal axis L running through the first pin 210 and, similarly, the second pin 212 includes a second orifice 238 extending into the second pin 212 in a direction along a longitudinal axis L running through the second pin 212. Both the first orifice 236 and the second orifice 238 are polygonal-shaped (e.g., square or four-sided or hexagonal or six-sided) and configured to receive a correspondingly shaped tool or key (e.g., a square-key or a hex-key) such that the pins 210, 212 may be prevented from rotation with respect to the first flange member 216 and the second flange member 226 when the first collar 230 and the second collar 232 are secured, respectively, to the first pin 210 and the second pin 212. The features just described enable securement of the plate member 234 to the first flange member 216 and to the second flange member 226 without the need to manipulate a tool (e.g., a wrench) between the outer surface 223 of the support member and the first underside surface 222 of the first flange member 216 and second underside surface 228 of the second flange member 226. The feature facilitates minimization of the distance 220 and also facilitates manipulation of the first pin 210 and the second pin 212 (e.g., to remove the clamp fixture 208 from the support spacer bracket 206) from an upper side of the clamp fixture 208, thereby reducing the space required for manipulation of tools.

Figure 3A:
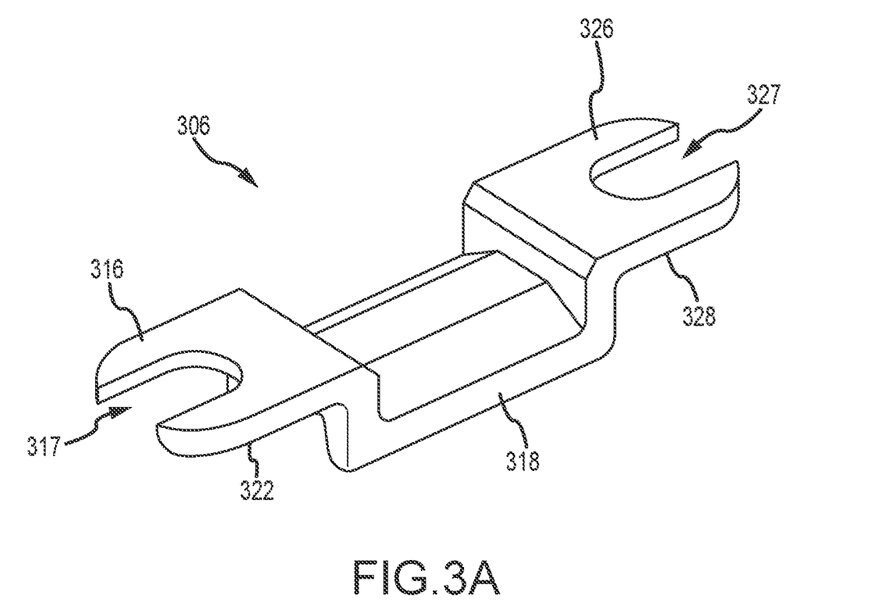
FIGS. 3A and 3B are schematic representations of an upper side and a lower side, respectively, of a support spacer bracket, in accordance with various embodiments.
Figure 3B:
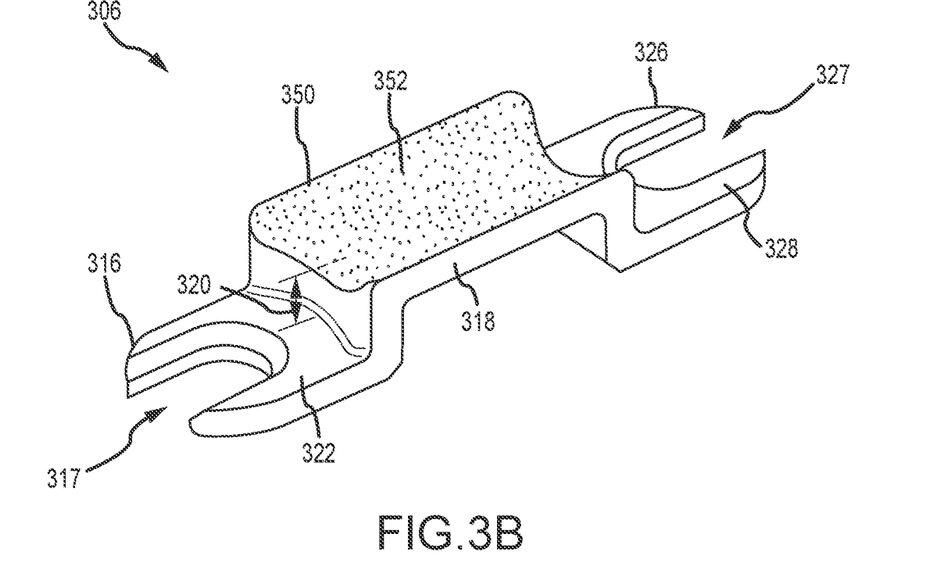

Referring now to FIGS. 3A and 3B, a support spacer bracket 306 (or a bracket), similar to the support spacer bracket 106 and to the support spacer bracket 206 above described, is illustrated. Similar to the description above, the support spacer bracket 306 includes a first flange member 316 and a second flange member 326 that are connected to a base portion 318 (or a base member). In various embodiments, the first flange member 316 includes a first slot 317 configured to receive a first pin (e.g., the first pin 210) by sliding the first pin into place via the first slot 317. Similarly, the second flange member 326 includes a second slot 327 configured to receive a second pin (e.g., the second pin 212) by sliding the second pin into place via the second slot 327. The first slot 317 and the second slot 327 facilitate the first pin and the second pin, respectively, to be slid into place following attachment of the support spacer bracket 306 to a support rail (e.g., the support rail 204). Once slid into place a first head of the first pin bears against a first underside surface 322 of the first flange member 316 and a second head of the second pin bears against a second underside surface 328 of the second flange member 326. In various embodiments, the base portion 318 includes an undersurface 350 that is shaped to match the shape of the surface of the support rail. As illustrated in FIG. 2A, for example, the undersurface 350 is curved in circular fashion to match the generally circular cross-sectional shape of the support rail 204. While the support rails illustrated and described in this disclosure are generally circular in cross section, the disclosure contemplates the undersurface 350 and the corresponding support rail having other shapes, such as, for example, flat or polygonal shapes. In addition, and as illustrated, the undersurface 350 of the base portion 318 is offset a distance 320 (e.g., the distance 120 or the distance 220) from the first underside surface 322 of the first flange member 316 and the second underside surface 328 of the second flange member 326, with the distance 320 being just sufficient, as described above, to accommodate an axial thickness of a head of a bolt or a pin or a similar fastening structure.

Still referring to FIGS. 3A and 3B, a method of attaching the support spacer bracket 306 to a support rail may be described. In a first step, a brazing foil 352 is applied to the undersurface 350 of the base portion 318. In various embodiments, the brazing foil 352 is a eutectic composition comprising a transition metal, such as, for example, nickel, iron or copper, combined with a metalloid material, such as, for example, silicon, boron or phosphorous. Once the brazing foil 352 is applied, in various embodiments, a second step includes stich welding the base portion 318 to the support rail. The stich welding step involves welding the base portion 318 to the support rail at intermittent locations (in contrast to a full seam weld) along the length of the base portion 318 to secure the support spacer bracket 306 to the support rail. In a third step, the support rail (or a section thereof) and the support spacer bracket 306, attached to the support rail via the stich welds, are placed into a brazing oven or furnace, at which point the brazing foil 352 is melted and subsequently allowed to solidify and join the base portion 318 of the support spacer bracket 306 together with the support rail. Once joined, a clamp fixture (e.g., the clamp fixture 208) may be secured to the support spacer bracket 308 via the first pin and the second pin and, respectively, the first collar and the second collar (e.g., the first collar 230 and the second collar 232). While the disclosure focuses on a brazing process to secure the support spacer bracket 306 to the support rail, the disclosure contemplates similar processes, such as, for example, full or partial seam welds or suitable adhesives.

Figure 4:
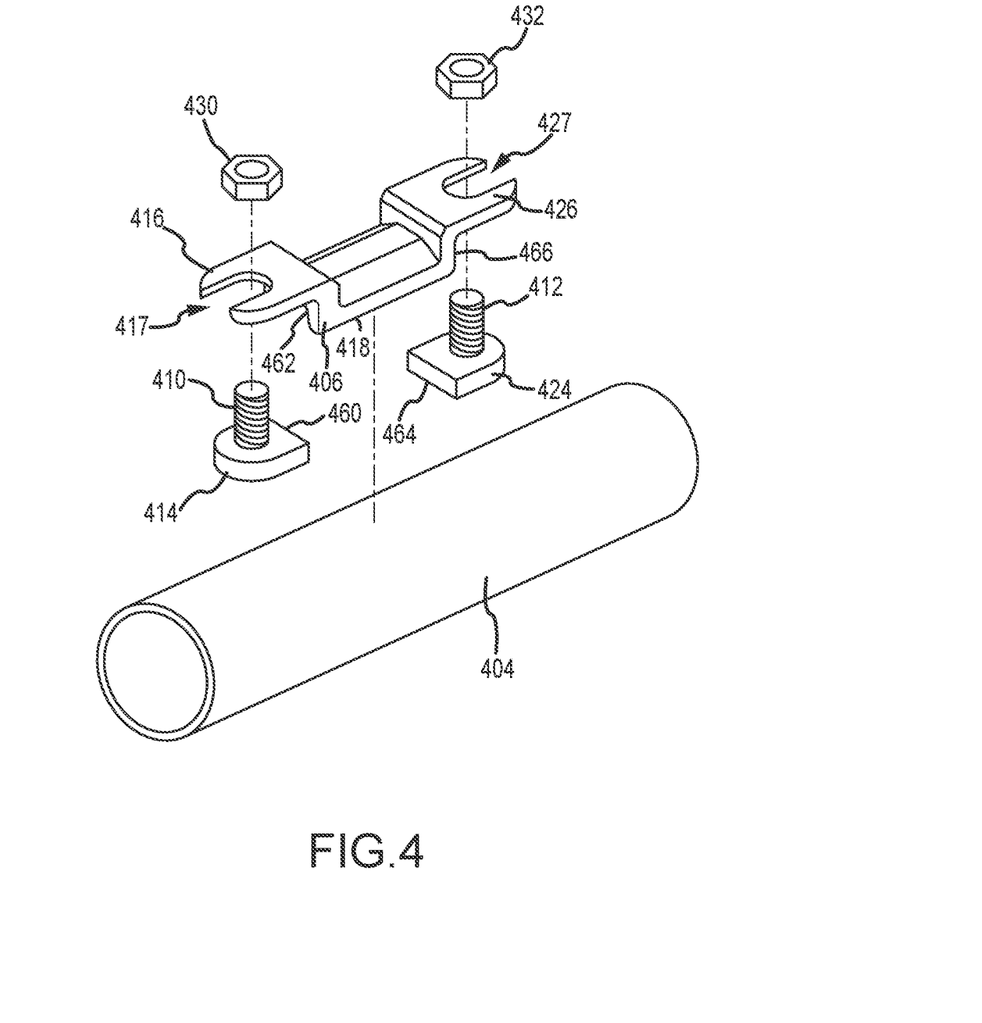
FIG. 4 is an exploded schematic representation of a support spacer bracket and attachment hardware for mounting a sensor circuit to a support rail, in accordance with various embodiments.
Figure 5:
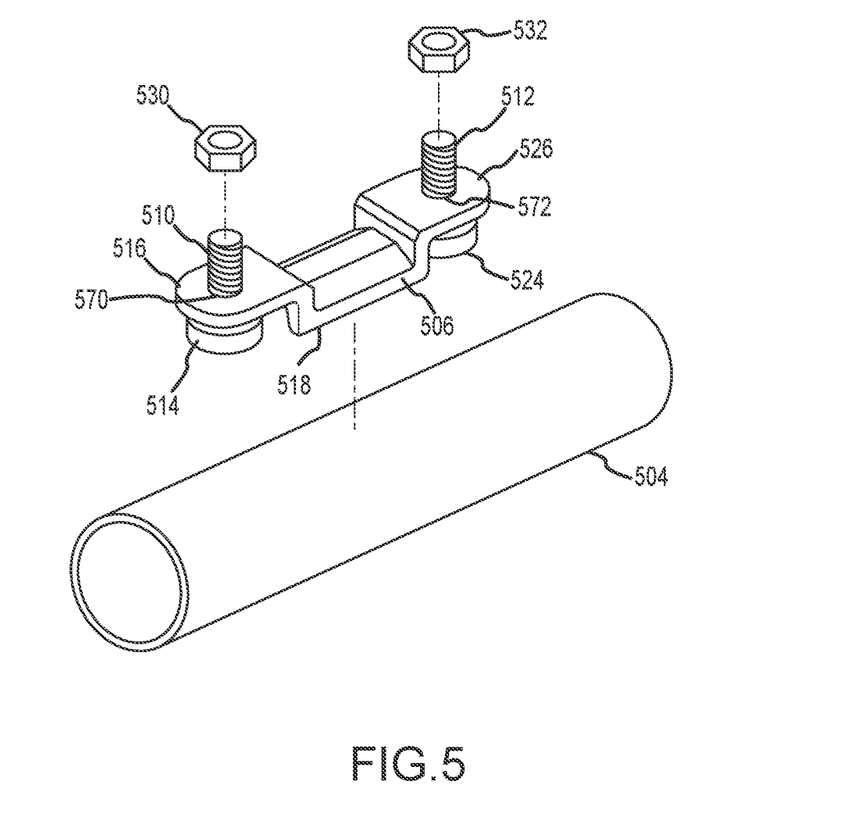
FIG. 5 is an exploded schematic representation of a support spacer bracket and attachment hardware for mounting a sensor circuit to a support rail, in accordance with various embodiments.

Referring now to FIGS. 4 and 5, alternative embodiments to the foregoing embodiments are described. With reference to FIG. 4, for example, a support spacer bracket 406 (or a bracket) is configured for attachment to a support rail 404 in a manner as described above—e.g., by stich welding and subsequent brazing of an undersurface of a base portion 418

(or a base member) of the support spacer bracket 406 to the support rail 404. Similar to the above description, the support spacer bracket 406 includes a first flange member 416 having a first slot 417 configured to receive a first pin 410 and a second flange member 426 having a second slot 427 configured to receive a second pin 412. As illustrated, the first pin 410 includes a first head 414 having a D-shaped configuration. The D-shaped configuration includes a first flat face 460 configured to abut a first flat base 462 of the base portion 418 that corresponds to the first flat face 460. Similarly, the second pin 412 includes a second head 424 having a D-shaped configuration, where the D-shaped configuration includes a second flat face 464 configured to abut a second flat base 466 of the base portion 418 that corresponds to the second flat face 464. The first flat face 460 and the second flat face 464 of the first head 414 and the second head 424, respectively provide anti-rotation features that minimize or prevent the first pin 410 and the second pin 412 from rotating while locking a clamp fixture (e.g., the clamp fixture 208) to the support spacer bracket 406. In various embodiments, a first nut 430 (or a first fastener) is threaded on to the first pin 410 and a second nut 432 (or a second fastener) is threaded on to the second pin 412 to secure the clamp fixture to the support spacer bracket 406. In various embodiments, a first collar and a second collar (e.g., the first collar 230 and the second collar 232) may be substituted for the first nut 430 and the second nut 432.

With reference now to FIG. 5, a support spacer bracket 506 (or a bracket) is configured for attachment to a support rail 504 in a manner as described above—e.g., by stich welding and subsequent brazing of an undersurface of a base portion 518 (or a base member) of the support spacer bracket 506 to the support rail 504. In contrast to the above description, the support spacer bracket 506 includes a first flange member 516 having a first aperture 570 configured to receive a first pin 510 and a second flange member 526 having a second aperture 572 configured to receive a second pin 512. In further contrast to the foregoing embodiments, the first pin 510 is press fit into the first aperture 570 and the second pin 512 is press fit into the second aperture 572. The press fitting provides an anti-rotation feature that prevents the first pin 510 and the second pin 512 from rotating while locking a clamp fixture (e.g., the clamp fixture 208) to the support spacer bracket 506. In various embodiments, a first nut 530 (or a first fastener) is threaded on to the first pin 510 and a second nut 532 (or a second fastener) is threaded on to the second pin 512 to secure the clamp fixture to the support spacer bracket 506. In various embodiments, a first collar and a second collar (e.g., the first collar 230 and the second collar 232) may be substituted for the first nut 530 and the second nut 532. Note that because the first pin 510 and the second pin 512 are press fit into, respectively, the first flange member 516 and the second flange member 526, the stich welding and brazing of an undersurface of a base portion 518 of the support spacer bracket 506 to the support rail 504, as described above, are, in various embodiments, performed subsequent to the pins being press fit into the flange members.

Figure 6:
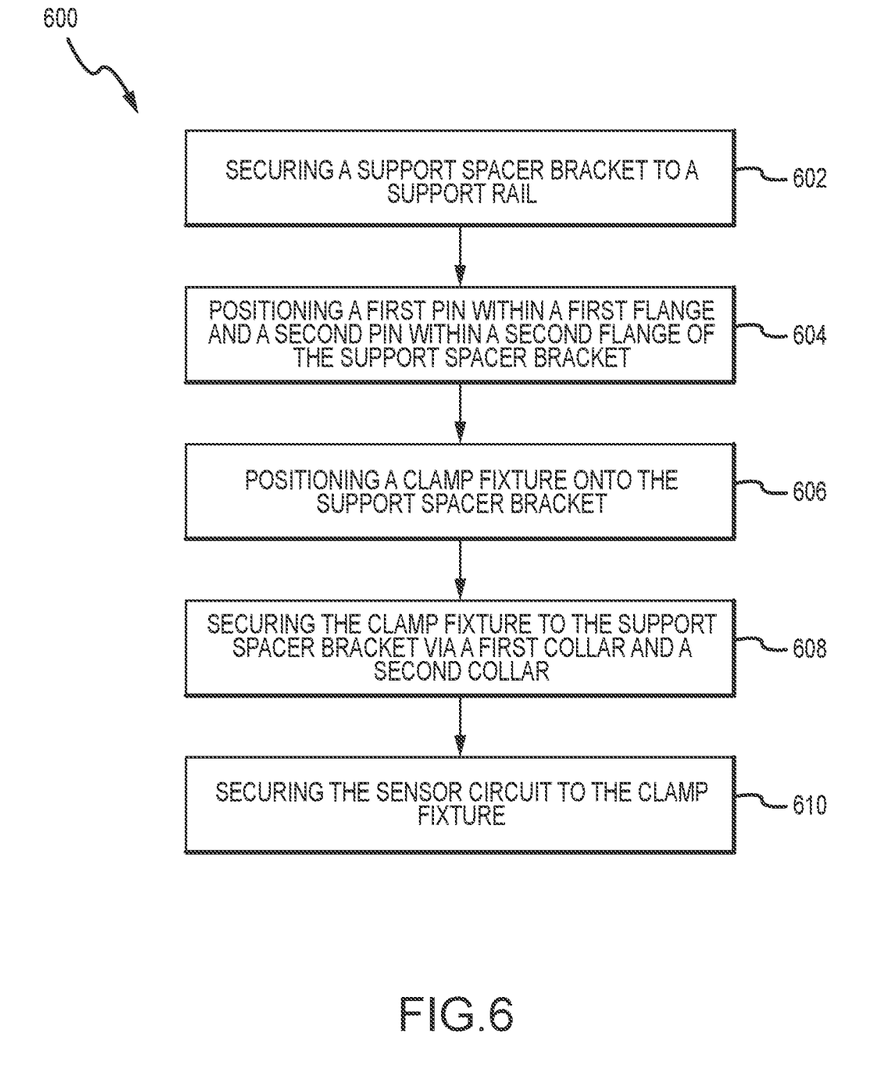
FIG. 6 is a flowchart describing various steps for mounting a sensor circuit to a support rail, in accordance with various embodiments.

Referring now to FIG. 6, a method 600 for mounting a sensor circuit to a support rail is described, in accordance with various embodiments. In a first step 602, a support spacer bracket is secured to a support rail. In various embodiments, the support spacer bracket (e.g., the support spacer bracket 206) includes a base portion that interconnects a first flange member and a second flange member, with the base portion having an undersurface that exhibits the same shape as the support rail. In various embodiments, securing the support spacer bracket to the support rail comprises stitch welding or brazing the undersurface of the base portion to the support rail, as described above with reference to FIGS. 3A and 3B. In a second step 604, a first pin is positioned within a first flange member (e.g., the first pin 210 and the first flange member 216) and a second pin is positioned within a second flange (e.g., the second pin 212 and the second flange member 226). In a third step 606, a clamp fixture (e.g., the clamp fixture 208) is positioned onto the support spacer bracket. In a fourth step, the clamp fixture is secured to the bracket via a first collar and a second collar (e.g., the first collar 230 and the second collar 232). In a fifth step 610, a sensor circuit (e.g., the sensor circuit 102) is secured to the clamp fixture.

The foregoing disclosure provides a practical means for mounting a sensor circuit to a support rail via a mounting fixture. The use of pins and collars (or fasteners) facilitates a relatively low profile and a relatively low protrusion (e.g., overall distance from the support rail) embodiment when compared to conventional mounting fixtures. The low profile and protrusion facilitate positioning of the mounting fixture in spaces having a tight clearance. The disclosure also provides for a mounting fixture to be manufactured and assembled without exposing the pins or fasteners to the brazing process through the use of slots in the flange members of the support spacer bracket and for securing a clamp fixture to the support spacer bracket from the same side of the pin and collar (or nut) assembly. The disclosure also minimizes adverse impacts to hardware replacement during routine maintenance or replacement of the sensor circuit or components of the mounting fixture. In addition, the design of the support spacer bracket facilitates simple machining or fabrication of the component for relatively low-cost production when compared with more conventional mounting fixtures. Further, brazing of the support spacer bracket to the support rail results in reduced stresses on the support rail in high-temperature and vibratory environments. The design also enables use of off the shelf componentry, such as, for example, sensor clips and pin and fastener hardware.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A mounting fixture for mounting a sensor circuit to a support rail, comprising:
    a bracket having a base portion and a first flange member extending from a first side of the base portion and a second flange member extending from a second side of the base portion opposite the first side of the base portion, wherein the base portion comprises an undersurface and the first flange member is offset a distance from the undersurface;
    a clamp fixture connected to the first flange member, the clamp fixture including a plate member configured for engagement with the first flange;
    a first pin extending through the first flange member and the plate member;
    a first fastener threaded on to the first pin and configured to secure the plate member to the first flange member; and
    a second pin extending through the second flange member and the plate member.

2. The mounting fixture of claim 1, wherein the undersurface is configured to match a mounting surface of the support rail.

3. The mounting fixture of claim 2, wherein the first flange member includes a first slot configured to receive the first pin.

4. The mounting fixture of claim 3, wherein the first pin includes a first orifice extending in a direction along a longitudinal axis into the first pin and configured to receive a key.

5. The mounting fixture of claim 4, wherein the first orifice is polygonal-shaped.

6. The mounting fixture of claim 5, wherein the first pin includes a first head configured to abut a first underside surface of the first flange member.

7. The mounting fixture of claim 6, further comprising a second fastener threaded on to the second pin and configured to secure the plate member to the second flange member.

8. The mounting fixture of claim 7, wherein the second flange member includes a second slot configured to receive the second pin.

9. The mounting fixture of claim 8, wherein the second pin includes a second orifice extending into the second pin and configured to receive the key.

10. A method for mounting a sensor circuit to a support rail, comprising:
    attaching a bracket to the support rail, the bracket having a base portion and a first flange member extending from the base portion and a second flange member extending from the base portion the first flange member and the second flange member disposed on opposite sides of the base portion, the base portion including an underside surface configured to match a mounting surface of the support rail, wherein the first flange member is spaced from the support rail, wherein attaching the bracket to the support rail includes brazing or welding the undersurface of the base portion to the mounting surface of the support rail;
    connecting a clamp fixture to the first flange member, the clamp fixture including a plate member configured for engagement with the first flange member;
    extending a first pin through the first flange member and the plate member; and
    threading a first fastener on to the first pin to secure the plate member to the first flange member.

11. The method of claim 10, wherein threading the first fastener to the first pin includes preventing the first pin from rotating via a key configured for positioning into a first orifice extending in a direction along a longitudinal axis into the first pin.

12. The method of claim 11, wherein the first pin includes a first head configured to abut a first underside surface of the first flange member.

13. The method of claim 12, further comprising extending a second pin through the second flange member and the plate member and threading a second fastener on to the second pin to secure the plate member to the second flange member.

14. The method of claim 13, wherein the second flange member includes a second slot configured to receive the second pin.

15. The method of claim 14, wherein the second pin includes a second orifice extending into the second pin and configured to receive the key.

\* \* \* \* \*